UNITED STATES PATENT OFFICE.

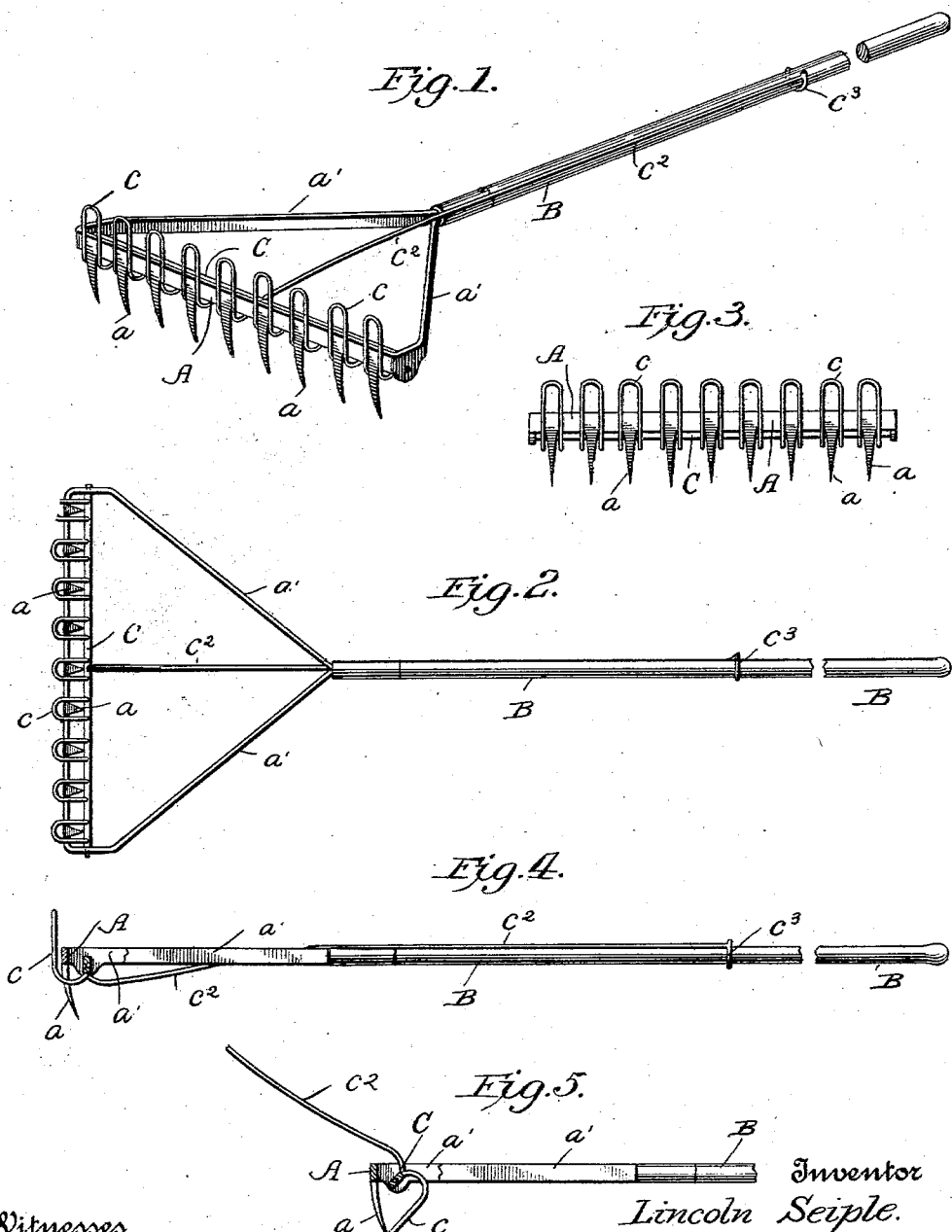

LINCOLN SEIPLE, OF ALEXANDRIA, INDIANA.

RAKE.

SPECIFICATION forming part of Letters Patent No. 629,927, dated August 1, 1899.

Application filed April 4, 1899. Serial No. 711,736. (No model.)

*To all whom it may concern:*

Be it known that I, LINCOLN SEIPLE, a citizen of the United States, residing at Alexandria, in the county of Madison and State of Indiana, have invented certain new and useful Improvements in Rakes; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to improvements in rakes having means whereby the teeth may be readily freed of any accumulated material which becomes fastened about the same.

The object of the invention is to combine with the ordinary form of garden-rake a lawn-rake movably mounted thereon and adapted to be operated between the teeth of the former and form an ejector or cleaner therefor, while the usual functions of both rakes will be preserved.

The invention consists of certain novel features in the arrangement and construction of parts, as hereinafter fully described, and pointed out in the claims.

In the accompanying drawings, Figure 1 is perspective view of the combined rakes; Fig. 2, a plan view showing the main rake inverted; Fig. 3, a view in front elevation; Fig. 4, a view in side elevation and partly in section, showing the lawn-rake in its normal position; and Fig. 5, also a similar side view showing the position assumed by the lawn-rake when used for cleaning the teeth of the main rake.

Referring to the drawings, A indicates the main rake, which is known as a "garden-rake" on account of the straight and pointed character of its teeth $a$. This rake is preferably connected with the handle B by the converging arms $a'$, connected to the rake proper at its ends or formed or cast integral therewith. These connecting-arms not only form a frame by which the raked material is compacted and supported for carrying when the rake is inverted, but are primarily designed to furnish a support in which a second rake C is pivotally mounted in the rear of the rake A. This second rake is what is known as a "lawn-rake," the teeth $c$ thereof being formed, preferably, of strong wire bent in the form of the letter U, bowed forward and connecting with the pivoted head from the under side. This rake C is so arranged with reference to rake A that the teeth $a$ extend through the loops or U-bends forming the teeth $c$, which are of such size and so curved as to extend about the head-piece of rake A, thus bringing such piece in the rear of the teeth $c$.

The primary object of the curved construction of teeth and the above arrangement thereof with those of the main rake is, as before stated, to make the lawn-rake serve as a cleaner to the other, and it will readily be seen that the curved form of the teeth $c$ causes them to have a cam-like action on the material accumulated between the teeth of the main rake. The same cleaning action takes place should the lawn-rake become clogged with material, in which case the main rake becomes the cleaner.

Normally the rake C occupies the position shown in Fig. 1, which permits the use of each rake by simply inverting the one not desired, and the said rake C is secured in its normal position by the lever $c^2$, which forms a tilting handle, as well as a connecting means for securing the lawn-rake to the handle B to preserve the normal position thereof. This lever is provided with a crotch or hoop $c^3$, which is held against the handle $b$ by virtue of the spring of said lever, which to make said engagements has to be sprung slightly from its natural position; but said lever may be secured to the handle by various other obvious methods.

Having thus fully described my invention, what I claim as new is—

1. The combination with a main rake, of a second rake mounted in pivotal relation thereto and comprising teeth normally extending in a reverse direction to those of the main rake, and a lever attached to the said second rake for moving the latter to clean the teeth of the main rake.

2. A main rake having combined therewith and movably mounted in the rear thereof, an auxiliary rake, the teeth of which project under the tooth-bar of the main rake and in an approximately opposite direction to that of the teeth of the main rake, as and for the purpose set forth.

3. A main rake having combined therewith and movably mounted thereon an auxiliary rake, having the teeth thereof formed to loop about the teeth of the main rake, as and for the purpose set forth.

4. A main rake having combined therewith an auxiliary rake movable to the main rake and so arranged that the teeth of said auxiliary rake normally extend in an approximately opposite direction to, and interlock with those of the main rake, and means for operating the auxiliary rake, as and for the purpose set forth.

In testimony whereof I affix my signature in presence of two witnesses.

LINCOLN SEIPLE.

Witnesses:
JENKIN HARRIS,
JAMES BANKS.